United States Patent Office 3,121,308
Patented Feb. 18, 1964

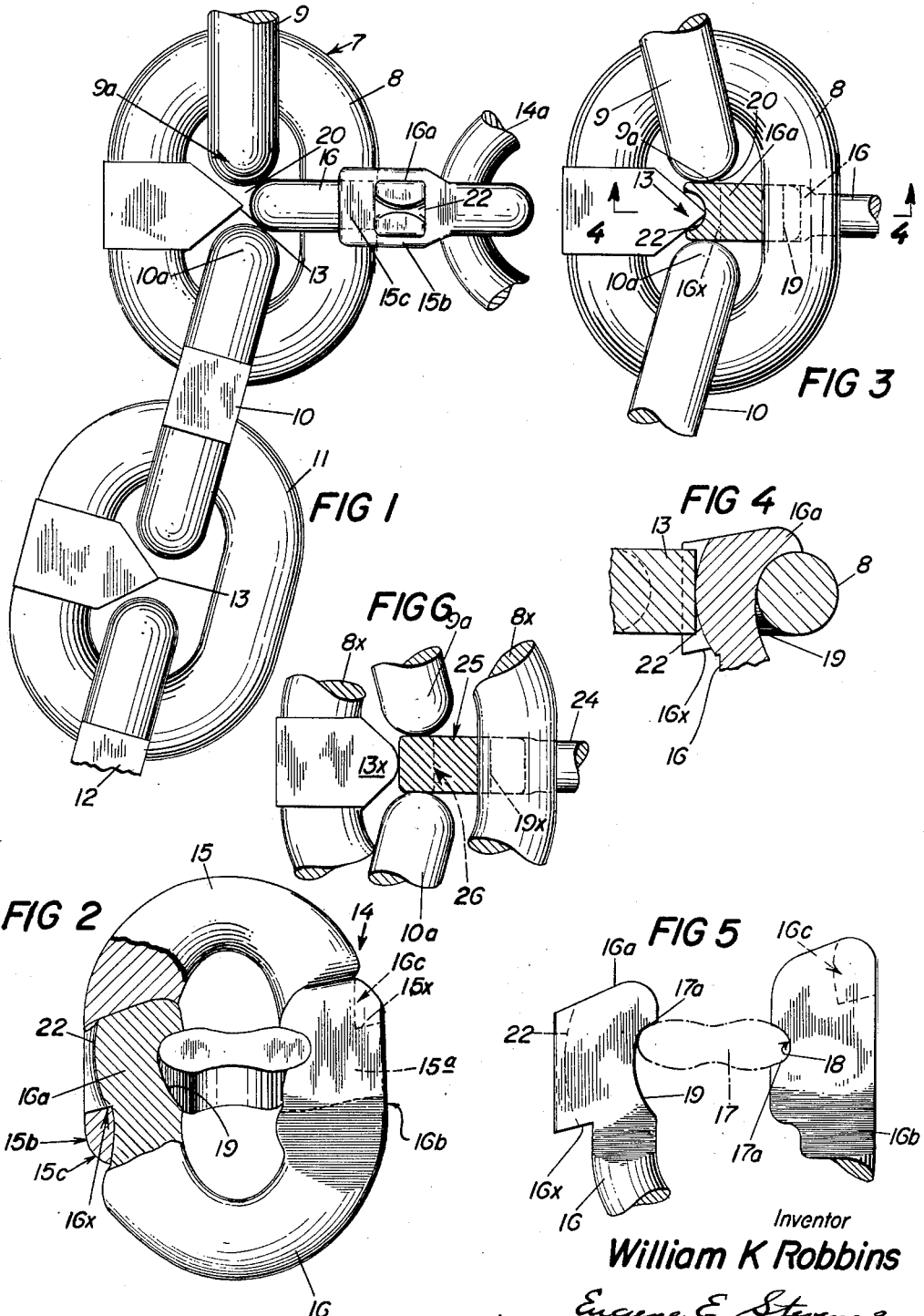

3,121,308
BRANCH CONNECTOR LINK FOR NON-KINKING CHAINS
William K. Robbins, 13453 Moorpark St., Sherman Oaks, Calif.
Filed May 1, 1961, Ser. No. 106,592
8 Claims. (Cl. 59—85)

My invention relates to separable section connecting links which are especially adapted for attaching a laterally extending chain or other connection to a length of so-called non-kinking chain.

Each of the links of a non-kinking chain is characterized by an inward projection provided by an intermediate portion of one or both link limbs for the purpose of separating the opposed ends of adjacent links so as to prevent chain kinking and thus maintain an adjacent link relationship which will facilitate handling of the chain and the quick pickup of longitudinal loads applied thereto.

Heretofore when a laterally extending sling element or other connection is to be attached to a particular non-kinking type link of a length of non-kinking chain, it has been necessary in the past to remove said link and replace it with an ordinary link; or a special link which lacks the characteristic inwardly extending limb-carried abutment of a non-kinking link. The reason that this time consuming and thus expensive procedure has heretofore been necessary is that what with the ends of adjacent links received in said particular non-kinking link on opposite sides of its inwardly extending limb-carried abutment, there simply is insufficient space left for the transverse passage of a limb terminal of a connector link section of adequate load-sustaining capacity, for many purposes.

It is therefore the primary object of the present invention to provide a novel and improved separable section type of link of adequate load-sustaining capacity which can be readily inserted at any point in a running length of non-kinking chain for attachment of a lateral connector thereto and without replacement of a non-kinking-type link thereof.

Invention also resides in certain novel features of construction, combination and arrangement of the various parts of said separable section link, and in the method of assembly of same with a non-kinking type of link of a running length of non-kinking chain.

Although the accompanying drawing illustrates a now preferred form of the invention, it is to be understood that same is to be considered as illustrative rather than limitative, since my inventive concept is susceptible of other mechanical expressions within the spirit and scope of the subject matter claimed hereinafter.

In the drawing, wherein the same reference characters have been used to designate the same parts wherever they appear in the several views—

FIG. 1 is an elevational view showing application of my novel lateral connector carrying link to a length of non-kinking chain;

FIG. 2 is a perspective view of my link, partly broken and partly in section;

FIG. 3 is a detail, partly in section, illustrating the method of assembly of a connector half with one of the chain links;

FIG. 4 is a sectional detail taken on the line 4—4 of FIG. 3;

FIG. 5 is a fragmentary plan view of one of two somewhat differently proportioned connector link sections, the position of a limb spacer for the assembled link being shown in dotted lines, and FIG. 6 is a detailed view similar to FIG. 4 of a modified connector.

Referring to the drawing by reference characters, a fragment of a length of non-kinking chain is indicated at 7 as including duplicate links 8, 9, 10, 11 and 12. As shown, one limb of each of said links has a pointed projection 13 extending inwardly to approximately one half of the link opening width. Thus the projections 13 function as spacers for the opposed ends of adjacent links such as the ends 9a, 10a of the links 9, 10.

As will be appreciated, the saddle-providing end portion of adjacent links are so maintained by spacers 13 as to prevent kinking action from taking place if, for instance, the chain is dropped in a pile. Also, the adjacent saddle-providing link end portions will immediately assume load-supporting engagement when the chain length 7 is subjected to longitudinal load.

Coming now to my separable section connector 14 for a lateral sling or other connection 14a (FIG. 1), it will be noted from an inspection of FIG. 2 that said connector 14 comprises the generally U-form sections 15, 16. These sections 15, 16 are preferably duplicates of one another, although this is not a prerequisite, as will be apparent hereinafter.

Thus, FIG. 2 shows the respective sections 15, 16 as having at one end the limb-provided and laterally extending terminal studs 15a, 16a which are received in the respective sockets 16b, 15b, which are provided by the other limb terminals of the companion section as in my Patent No. 2,761,275. The respective studs 15a, 16a provided shoulders 15x and 16x assume a load-sustaining engagement with the transverse socket-provided bridges 16c, 15c as in my said patent when the sections 15, 16 are assembled as in FIG. 2.

Also as disclosed in my said patent, the link sections 15, 16 are retained assembled by a floating spacer 17 whose bearing ends seat in one or the other of the aligned stud and socket-provided bearing recesses 19, 18 at opposite sides of the link 14. Spacer 17 sustains the opposed assembled link limbs to prevent approach of same toward one another when link 14 is under excessive load; and if one link limb lengthens more than the other in service, the spacer will, by rocking in its bearings, 19, 18, and 19, 18, compensate for said lengthening.

Coming now to the features of novelty presented and turning to the link 8 of FIGURES 1 and 3, it will be noted that the space 20 between link ends 9a, 10a and between the pointed end of link spacer 13 and the opposite limb of link 8 is quite restricted. However, such space 20 will accommodate the stud or socket-adjacent connector section-provided limbs of my aforementioned patent and of course the corresponding limb portions of the connector sections 15, 16 shown herein, and will still leave adequate working clearance. But such space 20 is too restricted depthwise (meaning from the point of spacer 13 to the opposite side limb of section 8) to admit of the passage therethrough of the heavy duty laterally projecting stud of my aforementioned patent; and the same would be true as to stud 16a (or 15a) shown herein were it not for at least one, if not both, of the modifications 19 and 22 to be presently described.

Thus, in carrying out the invention, the back of at least the stud 16a is provided with a transversely coextensive bearing recess 19 for a bearing end 17a of rockable spacer 17 which is wide enough to seat the inner peripheral portion of a limb of link 8, as indicated in FIGS. 3 and 4. In my aforementioned Patent No. 2,761,275, the stud back-provided bearing recess is restricted to conform to such as the bearing end 17a of the rockably floating spacer 17 which is indicated in FIGS. 2 and 5. As will be appreciated, the width-increased bearing recess 19, not being deep, will not appreciably weaken the stud end 16a of connector section 16. However, said stud bearing seat or recess 19 does effect an appreciable drawback of the outer end of stud 16 with respect to the pointed end of spacer 13 when the elements 8, 16 are being assembled with the stud bearing 19 rockably seated on a limb of link 8, as shown in FIGS. 3 and 4.

In assembling my connector with some non-kinking chains having relatively short link separators such as 13x in FIG. 6, a recess such as 19 in FIGS. 1–5 will effect a drawback of the outer stud end as to enable it to pass the inner end of the link spacer, as indicated in FIG. 6.

However, in the FIGS. 1–5 showing, the further provision of the arcuate open ended spacer (13) end-receiving groove 22 in the outer end surface of stud 16 is necessary to enable the connector section 16 to be rocked from the FIGS. 3 and 4 position to that of FIG. 1 without interference so far as the pointed end of spacer 13 is concerned.

An important point to be noted is that the present improvements enable me to use a connector link 14 having a limb cross-section of the maximum size permitted by the space 20 between link ends 9, 10 and between link spacer 13 and the opposite limb of link 8 when the saddle portions of the links 9, 10 are seated against opposite ends of a non-kinking link such as 8.

As will be appreciated, only the stud 16a of section 16 need have the width-increased rear recess 19 to receive a limb portion of link 8 to facilitate assembly; but of course the stud 15a of the other connector section can be so formed if desired.

Also to be noted is the fact that when the sections 16, 15 are assembled as in FIG. 2, the top and bottom bearing recesses 18 which are provided by each of the socket portions 15c, 16c make a close bearing fit with the bearing ends 17a of the floating and rockable limb spacer 17. Thus said limb spaced bearing ends 17a are maintained against bodily shifting lengthwise of the assembled connector 14 in service, even though the backs of both studs 16a and 17a may be provided with width-increased bearing recesses 19.

In FIG. 6 a modified link section 24 is substituted for section 16 of FIGS. 1–5 is shown being assembled with different non-kinking link 8x, as in FIG. 4. But here the adjacent link separator 13x is shorter than separator 13 in FIGS. 1–5 so that the outer end of the stud 25 of section 24 does not have to be grooved as at 22 in FIGS. 1, 3 and 4. However, the link section 24 has the stud back-provided seat 19x for a limb of link 8x and a stud 25 provides the load-supporting shoulder 26 corresponding to 16x in FIGS. 3 and 4.

The mode of assembly of my connector with a non-kinking link such as 8 (FIGS. 1–5) or 8x (FIG. 6) should be evident from the drawing. For instance, referring to FIG. 3, the stud 16a, having been inserted in link 8, is turned to the FIG. 1 position, following which connector section 15 is coupled thereto and spacer 17 driven into place.

Having thus described my invention, What I claim is:

1. In a two section connector link for use as a branch connector for connection to a portion of a limb of a non-kinking link which is spacedly opposed by the free end of a spacer projection from the other limb of said non-kinking link, and wherein each section of said connector link provides a sidewardly opening socket at one end and a laterally projecting stud at the other end, the stud of each section being seatable in the socket of the other section, a floating rigid abutment member removably interposed between the side limbs of said connector when said sections are assembled, the open side of each socket having aligned top and bottom bearing-providing edge recesses and the back of each stud having a bearing recess which is aligned with the related socket recesses when the sections are assembled whereby to provide receiving bearings for the ends of said abutment member; the improvement which comprises making the stud recess of a width to seat the first mentioned limb portion of the non-kinking type of link so as to retract the front of the laterally projecting stud away from the inner end of the opposed and inwardly projecting non-kinking link-provided spacer and enable said stud end to be rocked through the non-kinking link for subsequent coupling of the connector sections.

2. In a two section connector link for use as a branch connector for connection to a portion of a limb of a non-kinking link which is spacedly opposed by the free end of a spacer projection from the other limb of said non-kinking link, and wherein each section of said connector link provides a sidewardly opening socket at one end and a laterally projecting stud at the other end, the stud of each section being seatable in the socket of the other section, a floating rigid abutment member removably interposed between the side limbs of said connector when said sections are assembled, the open side of each socket having aligned top and bottom bearing-providing edge recesses and the back of each stud having a bearing recess which is aligned with the related socket recesses when the sections are assembled whereby to provide receive bearings for the ends of said abutment member; the improvement which comprises making the stud recess of a width to seat the first mentioned limb portion of the non-kinking type of link so as to retract the front of the laterally projecting stud with respect to the inner end of the opposed and inwardly projecting non-kinking link-provided spacer and the forward end of said stud having a spacer end receiving groove whereby to cooperate with said width-increased recess in enabling said stud end to be rocked through the non-kinking link for subsequent coupling of the connector sections.

3. The combination with a chain length comprising a series of connected links and including an intermediate non-kinking link, said non-kinking link having spaced and opposed side-providing limbs extending in the direction of its length, and a spacer extending inwardly from one limb of said non-kinking link and terminating short of the opposite limb for maintaining the ends of adjacent links out of contact with one another; of a separable section-incorporating branch connector for application to the second mentioned limb of said non-kinking link, one of said connector sections providing a laterally projecting stud terminal and the other section providing a receiving socket for said stud terminal, the front to rear depth of said stud terminal being greater than the distance between the inner end of said spacer and the opposed link limb, and the rear end of said stud terminal having a transverse bearing recess to at least partially receive the second mentioned link limb for rocking movement thereabout while disposing the forward stud terminal portion clear of the free end of said spacer so that the connector section-provided stud can pass through the space between the opposed ends of the chain links which are carried by opposite ends of said non-kinking link for subsequent connection to the companion connector section.

4. The structure of claim 3, and said connector comprising U-form sections providing side limbs and each section having a socket at one limb terminal and a laterally projecting stud at the other limb terminal, the stud of each section being received in the socket of the other section, there being removable means retaining said sections assembled to form said connector, and at least one of said studs having a back-provided bearing recess to at least partially receive a link limb.

5. The combination set forth in claim 3, and wherein said connector provides two U-form sections, each section providing a laterally projecting stud at one end and a socket at the other end, the studs of the respective sections received in the sockets of the other section, a floating rigid abutment member providing a bearing at each end, the inter-engaged studs and sockets having opposed bearing recesses receiving the bearing ends of said abutment member, at least the stud-provided portion of one of the bearing recesses being constituted by the aforesaid stud-provided link limb-receiving recess, and the socket-provided portions of the abutment member sustaining recesses being of less width than the limb-recess whereby to prevent shifting of the bearing ends of the abutment member longitudinally of the branch connector.

6. The structure of claim 5, and said stud having a load-sustaining socket-engaging shoulder.

7. The combination set forth in claim 3, but wherein the stud-provided bearing recess is of reduced depth and wherein the free forward end of said stud terminal has an open ended groove therein through which the free end of the non-kinking link-provided spacer passes when the stud-providing connector section is rocked about the second mentioned limb of the non-kinking link, whereby the stud-provided recess and groove cooperate in permitting assembly of the connector with said non-kinking link.

8. The combination set forth in claim 7, and wherein said connector provides two U-form sections, each section providing a laterally projecting stud at one end and a socket at the other end, the studs of the respective sections received in the sockets of the other section, a floating rigid abutment member providing a bearing at each end, the inter-engaged studs and sockets having opposed bearing recesses receiving the bearing ends of said abutment member, at least the stud-provided portion of one of the bearing recesses being constituted by the aforesaid stud-provided link limb-receiving recess, and the socket-provided portions of the abutment member sustaining recesses being of less width than the limb-recess, whereby to prevent shifting of the bearing ends of the abutment member longitudinally of the branch connector.

References Cited in the file of this patent

UNITED STATES PATENTS

| | | |
|---|---|---|
| 1,419,112 | Jones | June 6, 1922 |
| 2,718,741 | Meldohl | Sept. 27, 1955 |
| 2,761,275 | Robbins | Sept. 4, 1956 |
| 2,979,886 | Robbins | Apr. 18, 1961 |
| 2,995,889 | Johnson | Aug. 15, 1961 |